United States Patent
Kinlen et al.

Patent Number: 5,543,084
Date of Patent: Aug. 6, 1996

[54] ELECTROCOATING COMPOSITIONS

[75] Inventors: Patrick J. Kinlen, Fenton; Robert E. W. Jansson, Chesterfield, both of Mo.

[73] Assignee: Monsanto Company, St. Louis, Mo.

[21] Appl. No.: 469,483

[22] Filed: Jun. 6, 1995

Related U.S. Application Data

[62] Division of Ser. No. 393,128, Feb. 21, 1995.

[51] Int. Cl.⁶ ..................................................... H01B 1/12
[52] U.S. Cl. .......................... 252/500; 524/901; 528/422
[58] Field of Search .................. 252/500; 204/181.4, 204/181.7; 523/415; 524/901; 528/422

[56] References Cited

U.S. PATENT DOCUMENTS

| | | | |
|---|---|---|---|
| 4,614,775 | 9/1986 | Bekooij et al. | 204/181.6 |
| 5,233,000 | 8/1993 | Yodice | 204/59 R |

FOREIGN PATENT DOCUMENTS

| | | | |
|---|---|---|---|
| 167339 | 7/1989 | Japan | |
| WO93/14166 | 7/1993 | WIPO | |

*Primary Examiner*—John Niebling
*Assistant Examiner*—Kishor Mayekar
*Attorney, Agent, or Firm*—Howell & Haferkamp, L.C.

[57] ABSTRACT

A method for forming a coating on an electrically conductive surface is disclosed. The method comprises the steps of immersing the surface in a bath comprising an electrodepositable mixture of an intrinsically insulative polymer and an organic acid salt of an intrinsically conductive polymer, applying a voltage between an electrode and the surface in the bath to deposit a polymeric coating of the mixture on the surface, and curing the polymeric coating. The polymeric coating can be made electrically conductive by the additional step of immersing the polymeric coating in an organic acid after the deposition and before curing. A multilayered coating can be provided after curing the electrically conductive polymeric coating, by depositing a second or subsequent coating of an electrodepositable organic resin from an aqueous bath containing the resin on application of a voltage between an electrode and the electrically conductive polymeric subcoating in the bath. Also disclosed are resin compositions suitable for cationic electrodeposition.

5 Claims, No Drawings

ELECTROCOATING COMPOSITIONS

This is a divisional of copending application Ser. No. 08/393,128 filed on Feb. 21, 1995.

BACKGROUND OF THE INVENTION (1) Field of the Invention

The present invention relates to electrodeposition compositions and methods for forming coatings and more particularly to electrodeposition compositions comprising organic acid salts of electrically conductive polymers and methods for forming coatings therefrom.

(2) Description of the Prior Art

Cathodic electrodeposition utilizes a direct current to cause positively charged electrolytes in an aqueous medium to form a coating on the cathode. The electrolytes are usually polymers with basic groups in the form of primary, secondary or tertiary amines, or quaternary ammonium, sulfonium or phosphonium groups, neutralized with an organic or an inorganic acid. Common resin compositions used in cathodic electrodeposition are modified epoxy resins containing amino groups. The resins are dispersed in water by neutralizing with organic acid. Crosslinking agents that are typically blocked isocyanates are blended with the resin to effect curing of the film upon applying heat after electrodeposition.

The positively charged polymers are dispersed in an aqueous medium such that upon applying a voltage between an article having a conductive surface serving as a cathode and a counter-electrode both of which are in contact with the aqueous medium, the positively charged polymer migrates to the conductive surface. There the polymer loses its charge, becomes insoluble and forms an insulating film on the conductive surface. As the deposition progresses, the conductive surface becomes insulated which advantageously allows uniform coating over even remote areas, i.e. interior or recessed areas. However, this insulating of the conductive surface by the deposited layer also has the effect of limiting film thickness in practice to a maximum of about 35 to 50 microns.

Cathodic electrodeposition provides excellent corrosion-protective coatings for automobiles and for appliances while diminishing the usage of the volatile organic solvents required for painting. Where metals are electrocoated, pretreatment is required to obtain optimal corrosion resistance for the coating. A chrome rinse is usually used as a pretreatment. Chromium, however, is considered to have a high toxicity hazard and, therefore, an electrocoating method that does not require a chrome pretreatment would be desirable.

International application WO 93/14166 disclosed an anticorrosive paint comprising a binder and an electrically conductive polymer that according to the disclosure could be applied by electrodeposition. The binders disclosed included epoxy resins with crosslinkers and electrically conductive polymers including polyaniline doped with an organic acid. Electrodeposition was mentioned as one of the possible ways of applying the paint. The disclosure indicated that negatively charged paint particles can be applied in an anodic deposition process (page 44 of the WO 93/14166 application). However, such a process is inapplicable to the deposition of the positively charged polyelectrolyte of a polyaniline salt. Therefore, this reference teaches an unworkable method for deposition.

U.S. Pat. No. 5,128,396 disclosed a coating composition comprising a film forming binder such as epoxide resin with polyamide along with an amine salt of a ketoacid. One of the amines disclosed was aniline. Addition of the amine salt of the ketoacid provided an improved coating composition that could be applied by electrodeposition. This reference, however, did not disclose the addition of an organic acid salt of a polymer base. Furthermore, it has been the general view in the art of electrodeposition that low molecular weight species are undesirable in electrocoatings because they can cause film distortion and rupturing (Wismer et al., *J Coatings Technol* 54:35–44, 1982).

Thus, it would be desirable in the art of electrodeposition to provide an electrocoating composition and method that confer excellent corrosion inhibition upon the coating and that can be electrodeposited without requiring a chromium pretreatment of the metal. It would further be desirable to provide a component of the electrodeposited coating that could allow the film to be electrically conductive. Such a coating would passivate anodic sites on a metal surface and provide optimal protection against corrosion. If a base coat were electrically conductive, it would allow application of a second and subsequent coats by electrodeposition to achieve a greater thickness than can be obtained with a single coating or to obtain multiple layers of differing composition. Thus, it would be desirable to be able to readily electrically deposit a coating having a thickness greater than 35 to 50 microns and having multiple layers of the same or differing composition.

SUMMARY OF THE INVENTION

The present invention is, therefore, directed to a novel method for forming a coating on an electrically conductive surface comprising immersing the electrically conductive surface in an aqueous bath comprising an electrodepositable mixture of an ionic intrinsically insulative polymer (IIP) and an organic acid salt of an intrinsically conductive polymer (ICP). A voltage is applied between the conductive surface and an electrode to deposit a coating of said polymeric mixture on the surface. The dried and/or cured coating of the polymeric mixture is electrically insulative.

As used herein an "ICP" is a polymer that when provided as an electrodeposited coating can be converted to a conductive state by exposure to an organic acid such as 0.5M p-toluene sulfonic acid. The ICP's within the scope of this invention are typically organic polymers that have a polyconjugated n-electron system such as polyaniline, polypyrrole, polythiophene and derivatives thereof.

As used herein an "IIP" is a polymer that when provided as an electrodeposited coating cannot be readily converted to a conductive state by exposure to an organic acid such as 0.5M p-toluene sulfonic acid. Typical IIP's include, but are not limited to, epoxide resins, polyurethane resins, aminoplast resins, acrylic resins or mixtures thereof.

The present invention is also directed to a method for forming an electrically conductive coating on an electrically conductive surface in which a polymeric coating is first deposited and then prior to the curing, the coating is immersed in an organic acid.

The present invention is also directed to method for forming a coating having a thickness greater than about 60 microns by electrodepositing one or more subsequent polymeric coatings on to electrically conducting polymeric subcoatings. Thus, the present invention is also directed to a method for electrodepositing multiple coatings, e.g. coatings that provide different properties, such as a protective topcoat on a conductive primer.

The present invention is also directed to a composition for forming a coating in an electrodeposition process comprising water, an electrodepositable mixture of an IIP and an organic acid salt of an ICP.

Among the several advantages found to be achieved by the present invention, therefore, may be noted the provision of a method for forming an electrically insulative coating; the provision of a method for forming an electrically conductive coating; the provision of a method for forming an electrically conductive coating having a plurality of layers; and the provision of a composition that can be used for forming a coating having electrically insulative or conductive properties.

DETAILED DESCRIPTION OF THE PREFERRED EMBODIMENTS

In accordance with the present invention, it has been discovered that upon applying a voltage between an electrically conductive surface and an electrode both of which contact an immersion bath comprising water, an IIP and an organic acid salt of an ICP, a film is deposited on the surface. The IIP typically includes curing groups. The polymeric coating so formed is electrically insulative.

Surprisingly, the coating can be made conductive by immersing the polymeric coating in an organic acid after deposition, but prior to curing. The organic acid can be the same organic acid comprising the polymeric salt or a different organic acid. Furthermore, after the polymeric coating is cured, the process can be repeated to apply a second and, if desired, subsequent layers over the initial coating in order to obtain a coating of any desired thickness.

When provided as an electrodeposited coating, the ICP can be converted to a conductive state by exposure to an organic acid such as 0.5M p-toluene sulfonic acid. The ICP's within the scope of this invention are typically organic polymers that have a poly-conjugated π-electron system. (see Naarmann, H. and Theophilou, N., Synthesis of new electronically conducting polymers in *Electroresponsive Molecular and Polymeric Systems*, T. Skotheim, ed., Marcel Dekker, Inc., 1988, pp. 1–39 which is incorporated by reference). Examples of suitable ICP's for use in the present invention include polyaniline, polypyrrole, polythiophene, poly (3-alkylthiophenes) such as poly (3-octyl thiophene), poly (3-methyl thiophene) and poly-(3-thienylmethylacetate), polydiacetylene, polyacetylene, polyquinoline, poly-heteroarylenvinylene, in which the heteroarylene group can be thiophene, furan or pyrrole, poly-(3-thienylethylacetate), and the like, and derivatives, copolymers, and mixtures thereof. The polymer can typically exist in various valence states and can be reversibly converted into the various states by electrochemical reactions. For example, polyaniline can exist in numerous valence states such as a reduced state (leucoemeraldine), a partially oxidized state (emeraldine) and a fully oxidized state (pernigraniline). Polyaniline is most conductive in its emeraldine form. This partially oxidized state of polyaniline can be obtained by doping the polyaniline with any suitable organic acid to form the salt of the ICP.

Organic acids useful in forming the salt in connection with the present invention include organic sulfonic acids, organic phosphorus-containing acids, carboxylic acids, or mixtures thereof. Examples of useful organic sulfonic acids are p-toluene sulfonic acid, camphorsulfonic acid, dodecylbenzene sulfonic acid, dinonylnaphthalenesulfonic acid, dinonylnaphthalenedisulfonic acid, or mixtures thereof.

The polymeric salt can be formulated into a solution or emulsion in an organic solvent carrier. The carrier solvent is one in which the polymeric salt is substantially soluble and which can form a dispersion with the binder of the resin composition. The carrier solvent is a nonaqueous organic solvent having a dielectric constant typically less than about 17. Typical carrier solvents include xylene, toluene, 4-methyl- 2-pentanone, trichloroethylene, butylacetate, 2-butoxyethanol, n-decyl alcohol, chloroform, hexanes, cyclohexane, 1-pentanol, 1-butanol, 1-octanol, 1,4 dioxane, cyclohexane, and m-cresol. Mixed solvents can be used as well. The polymeric salt of the present invention is soluble in these solvents at a concentration equal to or greater than 1% by weight.

The ICP can be prepared by any of a number of methods including aqueous solution polymerization, emulsion polymerization or the like. When prepared by emulsion polymerization, the organic phase can serve as the carrier solvent. Thus, the polymeric composition within an organic phase can be used as the polymeric salt composition of the present invention. (For example, see copending application Ser. No. 08/355,143 which is incorporated by reference).

The electrodeposition composition in the immersion bath also includes an ionic IIP. When provided as an electrodeposited coating, however, the IIP cannot be readily converted to a conductive state by exposure to an organic acid such as 0.5M p-toluene sulfonic acid. Typical IIP's include, but are not limited, to epoxide resins, polyurethane resins, aminoplast resins, acrylic resins or mixtures thereof. The ionic IIP serves as a component of the electrodeposition resin prior to formation of the coating. In the electrodeposition resin an ionic IIP is conductive by virtue of its containing ionic groups introduced therein. The ionic groups render the IIP water dispersible and include, but are not limited to, cationic groups such as primary and secondary amines solubilized with acids, tertiary amines solubilized with acids, quaternary ammonium acid salts, quaternary ammonium hydroxides, quaternary phosphonium acid salts, ternary sulfonium acid salts or quaternary ammonium-carboxylate. For many applications, e.g. as a binder for an ICP, preferred ionic IIP's are epoxy cationics with quaternary ammonium salts or amine salts.

The predominant class of epoxy resins used in electrodeposition is the glycidyl ether epoxide resin type. Most prominent among these are epoxy resins based upon bisphenol A and epichlorohydrin produced by a condensation reaction of the polyhydroxy bisphenol A with epichlorohydrin in the presence of alkali.

The production of a durable, high molecular weight coating is accomplished by a curing or polymerization mechanism. Thus, the IIP can also include curing or crosslinking groups. One example of a crosslinker is a blocked isocyanate which is stable at bath temperatures but unblocks and crosslinks at reasonable baking temperatures. Curing or crosslinking of epoxy resins can also be accomplished using melamine/hydroxyl crosslinking or urethane/hydroxyl crosslinking, both of which can be cured by heating.

In addition to the IIP and the organic acid salt of the ICP, the resin composition can also contain further components. For example, pigments can be included in the resin composition. Suitable pigments are low in content of soluble ionic constituents which adversely affect bath stability, corrosivity and conductivity, as well as film performance. The pigment must be dispersible and resistant to flocculation and settling, as well as being able to impart the desired color and gloss to the film. Pigment to IIP content is usually 50% or lower by weight in order to allow adequate film flow with high film solids as well as provide a low viscosity environment for the suspension of the pigment. Any pigments meeting the above criteria are considered suitable and can be included in the resin composition.

When an electrically conductive film is desired, the polymeric coating can be immersed in an organic acid after formation of the coating and prior to curing the film. The organic acid can be the same organic acid that was used to form the salt of the ICP or it can be a different organic acid. Typical organic acids useful in treating the film to render the film electrically conductive include organic sulfonic acids, organic phosphorus-containing acids, carboxylic acids, or mixtures thereof. Useful organic sulfonic acids are p-toluene sulfonic acid, camphorsulfonic acid, dodecylbenzene sulfonic acid, dinonylnaphthalenesulfonic acid, dinonylnaphthalenedisulfonic acid, or mixtures thereof.

The method and composition of the present invention can be used to coat virtually any electrically conductive surface including a metal surface or a surface comprising an electrically conductive coating on a glass or plastic. Where the electrically conductive surface is a metal it can be virtually any metal including silver, aluminum, iron nickel, copper, zinc, cobalt, lead, iron based alloys such as steel, tantalum, titanium, zirconium, niobium, chromium, and the like, and alloys thereof. Preferred metals are aluminum and steel and alloys thereof and particularly preferred is the alloy steel. The metal surface or object may be in virtually any shape or form and includes thin films of metal that have been deposited by sputter deposition or similar methods on a non-metallic substrate. Where glass or plastic forms the substrate for the electrically conductive surface, the surface can comprise a coating comprising an electrically conductive material such as, a conductive polymer composition. (see copending applications Ser. Nos. 08/096,661 and 08/355,143; see also U.S. Pat. No. 4,983,690, U.S. Pat. No. 5,160,457, and U.S. Pat. No. 4,678,601 all of which are incorporated by reference). For example, a urethane primer composition containing a polyaniline salt can be applied as an electrically conductive film to the surface of a substrate prior to electrodeposition of the coating. When an electrically conductive coating is applied to a surface, the present method and composition are applicable to any of a wide variety of substrates including three dimensional objects.

The electrodeposited coating of the present invention also provides advantages from the incorporation of an ICP such as polyaniline into the electrodeposited film. Polyaniline is an ICP in which the electrical properties are determined by the oxidation state of the imine nitrogen atoms. A wide range of desirable electrical, electrochemical and optical properties in addition to excellent environmental and thermal stability is exhibited by polyaniline. Furthermore, the presence of the IIP in the resin composition and in the subsequent coating imparts to the film suitable adherence properties so that the coating is capable of adherence to an electrically conductive surface. This avoids the problem of delamination from a metal surface which can result when an ICP is applied alone.

The composition of the present invention can be used to produce a film that is capable of direct application by electrodeposition to an electrically conductive surface or object and the film thereby produced will adhere sufficiently to the surface such that it is not removed in a standard adhesion test such as ASTM Test #D3359. This test in general involves scribing an "X" or a series of cross hatches in the layer of coating to expose the bare metal, applying adhesive tape to the scribed portion, removing the adhesive and observing if any of the coating layer is removed and comparing the amount of coating that is removed to a standard classification table for the adhesion test as designated in ASTM Test #D3359, or other adhesion test accepted by the coatings industry.

The resin composition contains by weight from about 0.05 to about 95 percent of the ICP in organic carrier solvent; from about 1 to about 95 percent IIP; and from about 1 to about 95 percent water. Preferred resin compositions contain from about 0.1 to about 50 percent of the ICP; from about 10 to about 80 percent IIP; and from about 10 to about 80 percent water. Most preferred resin compositions contain from about 0.5 to about 25 percent of the ICP; from about 20 to about 70 percent IIP; and from about 20 to about 70 percent water.

Electrodeposition is at a temperature selected to be between about 25° C. to about 90° C. and the bath temperature is maintained at the selected constant temperature ± about 5° C. by any method known and recognized in the art. The resin is also agitated during the electrodeposition process to provide for dispersion of the resin composition.

Electrodeposition for only a few minutes, usually from about one to about 20 minutes, can be performed at voltages of up to about 500 volts. More preferably, the electrodeposition is for about 0.5 to about 10 minutes at a voltage of up to about 200 volts.

In many cases it is advantageous to use a lower voltage of less than 75 Volts. The methods and compositions herein can provide polymeric coatings when applying a voltage of 75 Volts or less. When desirable for certain applications, the present invention can also provide polymeric coatings at even lower voltages, for example, 50 Volts and even as low as 20 Volts.

After electrodeposition of the coating, the surface and coating thereon is rinsed with deionized water, air dried and cured. Where curing is by heating, the polymeric coating is baked at a temperature up to about 250° C. and typically about 150° C. for a period of from about 30 minutes to about 10 hours.

When it is desired that the film be electrically conductive, the surface and coating thereon is contacted with a solution containing the organic acid used to dope the film to the conductive form after the rinse with deionized water. This can be done by rinsing with an aqueous solution of the organic acid. Alternatively, the surface and film thereon can be washed with deionized water and immersed in a bath containing the organic acid solution. Contact of the film with the organic acid solution is for a sufficient period of time to dope the film, typically for a period of from about one to about 5 minutes. The surface is then cured.

One particular advantage to doping the electrodeposited coatings with an organic acid is in the nature of the anticorrosive protection provided. An organic acid as an additive to a coating provides corrosion inhibition due to passivating anodic sites. One particular organic acid that is thought to provide corrosion protection is dinonylnaphthalenesulfonic acid. Thus, doping with an organic acid as a counter ion of in a coating comprised of a polymeric salt provides a superior coating which is able to passivate anodic sites on a metal surface. Moreover, a coating made by the present invention avoids the problem of environmental hazard resulting from use of lead or chromium in corrosion inhibitors.

The ability to render the coating electroconductive allows a second and subsequent repeating of the electrodeposition process to provide a coating of any desired thickness. Coatings comprised of multiple electrodeposited layers of similar or different composition can, thus, be produced by repeated electrodeposition. In some circumstances, it might be advantageous to apply a subsequent coat by an anodic electrodeposition process. For example, application of current to the doped coating might cause the negatively charged organic acid counterions to migrate out of the coating to effectively dedope the coating. In such circumstances it might be advantageous to prepare a multilayered coating by alternating between cathodic and anodic electrodeposition for successive layers.

It may also be desirable to prepare a multilayered coating by the electrodeposition process of the present invention in which each layer serves a particular function. A base coat can serve a metal-filling function to cover the roughness of a steel surface and to mask the imperfections from the pressing and assembly operations. Furthermore, the coatings produced by the present invention can provide a base coat that affords corrosion-inhibiting protection through passivating anodic sites on the metal while providing good adhesion to the base metal. A topcoat can also be provided by the instant invention in which further corrosion protection is provided in the form of a protective barrier against corrosive substances and/or to provide a decorative appearance. Moreover, the topcoat can comprise a metallic base coat with a clearcoat applied over the metallic coat. All of these multilayered coatings can be provided by the present invention by virtue of the ability to render each coating electrically conductive to allow for application of a subsequent coating layer.

Industrial Applicability

The present invention is, therefore, useful for providing a protective coating to a wide variety of article. In particular, as applied to automobile coatings, a corrosion protecting coating is provided which can also be stone-chip resistant along with providing a decorative appearance. The pretreatment of the metal surface with lead or chromium compositions to provide corrosion protection and to improve adhesion of the organic coating is not required. The binder provides for good adhesive properties and the organic polymeric salt of a polymer base provides good corrosion protection. Furthermore, the use of electrodeposition substantially reduces the amounts of volatile organic solvents that are released into the atmosphere which can be more than 12 liters per car where the painting process is used. This is particularly important in meeting solvent emissions standards. The ability of the method in this invention to provide an electrodeposited coating of a thickness greater than 60 microns as well as providing a multilayered coating having the same or differing compositions in successive layers substantially reduces the usage of volatile organic solvents.

EXAMPLES

An ionic IIP used in the following examples and referenced as Cathoguard is an aqueous emulsion of an epoxy resin and a thermally activatable crosslinker prepared by mixing LEAD AND CHROME FREE CATHOGUARD (Manufacturer's No. G28AD012) emulsion and LEAD FREE ELECTROCOAT PASTE (Manufacturer's No. G28AD016) paste, both obtained from BASF Corp., Parsippany, N.J. and well mixed by magnetic stirrer for about nine days.

Preferred embodiments of the invention are described in the following examples. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples.

Examples 1–9

The following examples illustrate the preparation of electrodeposited coating of the ionic IIP, Cathoguard, on various electrically conductive surfaces under differing conditions of deposition.

The Electrodeposition bath resin was prepared by combining 102.3 grams of BASF Cathoguard emulsion, 23.9 grams of BASF Cathoguard paste, and 124.2 grams deionized water. This was done by combining about one-half of the water to the emulsion with agitation, which was thereafter continued until the end of the electrodeposition process. The paste was weighed in a separate container and then added to the emulsion-water mixture. The remaining one-half of the water was then used to rinse the paste container and then added to the mixture. The mixture was then poured through a 35 micron filter bag, type BMNO 35 (Filter Specialists, Inc., 100 Anchor Road, Michigan City, Ind.) into a 400 ml beaker. A stainless steel mesh fashioned to wrap around the inside of the 400 ml beaker served as an anode. A thermostatically controlled hot plate with stirrer was employed to maintain the bath at constant temperature with continuous agitation by a stirring bar. A Sorensen model DCR300-2.5 power supply used to provide the direct current for electrodeposition.

Example 1

A 4 cm by 0.5 cm aluminum electrode was wiped with methanol, suspended in the bath liquid and connected to the negative electrode. The bath temperature was 80° C., the voltage was 190 volts, which generated a current less than 2 amps and the plating time was 4 minutes. After completion of the electrodeposition process, the electrode with the film deposited thereon was rinsed with deionized water, air dried and heated overnight to cure in an oven at 150° C. under a nitrogen atmosphere at a reduced pressure of 20 inches of Hg. A mottled yellow coating resulted.

Example 2

A 2 cm by 7 cm carbon steel coupon (C1018 carbon steel) was coated with the polyaniline salt of a protonic acid dopant sold under the trademark "Versicon®" (Allied-Signal Inc., Buffalo, N.Y.), referenced hereinafter as C-PANI, in a formulation of poly(vinylbutyral) (PVB) (22% C-PANI by weight of PVB). This formulation was prepared as follows. PVB, 16 grams, was dissolved in 60 grams of methylethylketone and 60 grams absolute ethanol. C-PANI, 4.5 grams, was added and the mixture was dispersed using a ball mill overnight with ½" porcelain balls in a 400 ml mill. This mixture is designated Part A. 7.5 grams of 85% phosphoric acid was dissolved in 92.5 grams of n-butanol. This solution is designated Part B. 30 mls each of parts A and B were mixed together and spray coated onto steel coupons using production air brush (McMaster-Carr Co., Chicago, Ill.). The coated coupons were then dried 24 hours at 103° C.

The coated coupon was suspended in the bath liquid and connected to the negative electrode. The bath temperature was 80° C., the voltage was 190 volts (less than 2 amps current) and the plating time was 4 minutes. The electrodeposited film was rinsed with deionized water, air dried and then cured by heating at 150° C. overnight. A yellow, mottled coating resulted.

Example 3

A 2 cm by 7 cm carbon steel coupon was coated with C-PANI in the PVB formulation as in example 2, suspended in the bath liquid, and connected to the negative electrode. The bath temperature was 85° C., the voltage was 50 volts and the plating time was 1 minute. The electrodeposited film was rinsed with deionized water, air dried and then cured by heating at 150° C. overnight. A smooth gray coating resulted.

Example 4

A 2 cm by 7 cm carbon steel coupon was coated with C-PANI in the PVB formulation as in example 2, suspended in the bath liquid, and connected to the negative electrode. The bath temperature was 85° C., the voltage was 190 volts and the plating time was 4 minutes. The electrodeposited film was rinsed with deionized water, air dried and then cured by heating at 150° C. overnight. The resultant coating had a rough surface.

Example 5

A 2 cm by 7 cm carbon steel coupon was coated with C-PANI in the PVB formulation as in example 2, suspended in the bath liquid, and connected to the negative electrode. The bath temperature was 85° C., the voltage was 100 volts and the plating time was 1 minute. The electrodeposited film was rinsed with deionized water, air dried and then cured by heating at 150° C. overnight. A smooth gray coating resulted.

Example 6

A 2 cm by 7 cm microscope slide was coated with the dinonylnaphthalenesulfonic acid salt of polyaniline (PANDA) and dried. The PANDA was prepared by an emulsion polymerization process as in example 1 of copending application Ser. No. 08/355,143 which is incorporated by reference. The slide with PANDA coating was suspended in the bath liquid, and connected to the negative electrode. The bath temperature was 85° C., the voltage was 200 volts and the plating time was 4 minutes. The electrodeposited film was rinsed with deionized water, air dried and then cured by heating at 150° C. for 30 minutes. A gray coating formed on the PANDA.

Example 7

A 2 cm by 7 cm carbon steel coupon was coated with C-PANI in the PVB formulation as in example 2, suspended in the bath liquid, and connected to the negative electrode. The bath temperature was 30° C., the voltage was 100 volts and the plating time was 2 minutes. The electrodeposited film was rinsed with deionized water, air dried and then cured by heating at 150° C. for 30 minutes. A smooth gray coating resulted with some uncoated areas at the edges.

Example 8

A 2 cm by 7 cm aluminum plate was coated with C-PANI in the PVB formulation as in example 2, suspended in the bath liquid, and connected to the negative electrode. The bath temperature was 30° C., the voltage was 200 volts and the plating time was 4 minutes. The electrodeposited film thus formed showed blistering during the coating process. This electrodeposition was repeated with a 1 minute plating time and 200 volts as well as with a 4 minute plating time and 100 volts and, again, blistering as well as microscopic craters were produced. Finally, an aluminum plate was coated with PVB formulation without C-PANI and using a 1 minute plating time and 100 volts. A very light coating was produced that resembled spattered paint under the microscope.

Example 9

A urethane primer system was used to apply a electrically conductive film to the surface of a substrate prior to electrodeposition of the coating. The urethane primer was prepared in a part A composition comprising Desmophen 680-70 having a hydroxide equivalent weight of 740 (Miles Laboratories), 74.0 grams; butyl acetate, 33.8 grams; xylene, 26.6 grams; and methylisobutylketone (MIBK), 41.2 grams. The part B composition comprised Desmodur Z-4370 having a NCO equivalent weight of 365 (Miles Laboratories), 40.2; and butyl acetate 10.0 grams.

The polyaniline salt of p-toluene sulfonic acid (0.2 grams) was added to a solution containing 3.5 grams of part A and 1.0 grams Part B. The polyaniline salt did not disperse in the solution.

The polyaniline salt of dinonylnaphthylenesulfonic acid (PANDA) (0.5 grams) prepared by the emulsion-polymerization process of Example 1 in copending application Ser. No. 08/355,143 was added to 3.5 grams of part A and 1.0 grams of part B. A green solution readily formed indicating the polyaniline salt did not deprotonate. This solution was applied to an anodized aluminum panel using an air brush. The film was dried at 100° C. overnight.

A 2 cm by 7 cm panel coated with PANDA in polyurethane primer as described above was electrocoated. The bath temperature was 30° C., the plating time was 5 minutes, and the voltage was 300 volts. A good electrocoating was produced near the bottom of the panel.

The electrodeposited films on aluminum plate or glass microscope slide both of which were coated with the PANDA in the urethane primer were nonconductive using a standard multimeter (resistance greater than 30 megohms).

Example 10

This example illustrates the preparation of electrodeposited coatings containing the ionic IIP, Cathoguard, and an organic acid salt of the ICP, polyaniline and the measurement of electrical conductivity and color without and with doping of the electrodeposited coating with an organic acid.

An electrodeposition bath resin was prepared as indicated in examples 1–9 by combining 102.3 grams of Cathoguard emulsion, 23.9 grams of Cathoguard paste, and 124.2 grams deionized water. The mixture was then poured through a 35 micron filter bag (type BMNO 35, Filter Specialists, Inc., 100 Anchor Road, Michigan City, Ind.) into a 400 ml beaker on a thermostatically controlled hot plate with stirrer. A stainless steel mesh served as an anode.

A one inch by three inch aluminum plate was electroplated at a bath temperature of approximately 29° C. and at 190 Volts for 4 minutes. The film was rinsed with deionized water, blow dried with nitrogen and cured at 150° C. for 1 hour. The coating was smooth, even and light gray in color.

The polymeric salt of polyaniline and p-toluene sulfonic acid (PANI-PTSA) was prepared by an aqueous solution polymerization. Aniline, 16.7 grams (0.18 mole) and p-toluene sulfonic acid, 57.3 grams (0.3 mole) were added to 590 ml water in a stirred and jacketed reactor held at 5° C. and blanketed with nitrogen. Ammonium peroxydisulfate (51.1 grams in 120 ml water) was added dropwise over a 50 minute period. The mixture was stirred for 22 hours during which time a dark green precipitate formed. The precipitate was washed with 2 liters of a 10% solution of p-toluene sulfonic acid in water followed by 1 liter of isopropanol. After air drying the polymer yield was 70 grams.

Five grams of PANI-PTSA were added to the electrodeposition bath composition and mixed for approximately one hour. A one inch by three inch aluminum plate was electrodeposited in this composition at a bath temperature of approximately 29° C. and at 190 Volts for 4 minutes. The film was rinsed with deionized water, blow dried with nitrogen and cured at 150° C. for 30 minutes. The coating was smooth, even and dark blue-gray in color.

The bath composition was mixed for 3 days to insure thorough dispersion of the polyaniline and electrodeposition performed as above.

Another aluminum plate was electroplated in the electrodeposition bath composition containing PANI-PTSA. After deposition, the film was rinsed thoroughly for approximately one minute with 0.5M camphorsulfonic acid (CSA) instead of deionized water, blow dried with nitrogen and cured at 150° C. for 30 minutes. The coating was smooth, even and olive-drab in color.

Conductivity of the resultant films were measured using a standard multimeter in which the probes were placed approximately 1 cm apart. The results in Table 1 show that the electrodeposition composition prepared from the Cathoguard yielded a film that was nonconductive as was the film having PANI-PTSA added to the composition with 3 days of mixing. In contrast, the coating formed from the PANI-PTSA containing composition and subsequently washed with CSA showed a conductivity three orders of magnitude greater.

TABLE 1

| COMPOSITION | PREPARATION | RESISTIVITY (megohms) |
| --- | --- | --- |
| Cathoguard Alone | | $5 \times 10^7$ |
| Cathoguard + PANI-PTSA | 1 | $1 \times 10^7$ |
| | 2 | $5 \times 10^7$ |
| Cathoguard + PANI-PTSA + CSA Rinse | 1 | $3 \times 10^4$ |
| | 2 | $5 \times 10^4$ |

In order to relate the color of the film to the electrical conductivity, a HunterLabs Ultrascan was used to quantitate the reflectance on an L*, a*, b* rectangular coordinate system. The L* coordinate axis is a measure lightness on a lightness-to-darkness continuum; the a* axis is a measure on a continuum from green (minus) to red (plus); and the b* axis is a measure on a continuum from blue (minus) to yellow (plus). (See West, B., *Plastics Engineering* pp. 37–39, January 1987 which is incorporated by reference). Table 2 shows that the doping of the film with CSA causes a shift in the a* axis toward a green color (increasing minus) and away from a red color (plus) and a shift in the b* axis toward a yellow (plus) and away from a blue color (minus).

TABLE 2

| COMPOSITION | PREPARATION | L* | a* | b* |
| --- | --- | --- | --- | --- |
| Cathoguard Alone | | 76.15 | −0.84 | −1.07 |
| Cathoguard + PANI-PSTA | 1 | 64.79 | −2.42 | −4.96 |
| | 2 | 56.31 | −3.47 | −4.63 |
| Cathoguard + PANI-PTSA + CSA Rinse | 1 | 56.11 | −4.38 | 2.49 |
| | 2 | 55.46 | −4.14 | 1.60 |

Thus, the coating containing polyaniline that was rinsed with CSA showed a marked increase in conductivity as well as a distinct color change.

Example 11

This example illustrates the doping of the electrodeposited coating by immersion in a bath containing an organic acid.

In an initial test of this method, the film was immersed in a bath containing 0.5M CSA immediately after preparation. The result was that emulsion adhering to the coating gelled on contact with the acid and became difficult to rinse off.

In subsequent preparations, the electrodeposited film was first rinsed with deionized water and then soaked in an immersion bath containing acid. One inch by 3 inch aluminum plates were electrodeposited in the bath containing the Cathoguard mixed with PANI-PTSA at either 34° C. or 36° C. for 4 minutes at 190 V. Following a deionized-water rinse, the film was soaked for 2 minutes in 0.5M p-toluene sulfonic acid, blow dried with nitrogen and cured at 150° C. for 30 minutes.

Example 12

This example illustrates the preparation of a base coat and topcoat by cathodic electrodeposition.

A 1" by 3" aluminum plate was electrodeposited with the composition in example 10 made up of Cathoguard mixed with PANI-PTSA. Electrodeposition was at 34° C. for 4 minutes at 190 V. The base coat film was rinsed with deionized water and soaked for 2 minutes in a bath containing 0.5M p-toluene sulfonic acid.

The film was then blow dried with nitrogen and cured at 150° C. for 30 minutes. A topcoat was then electrodeposited in the bath containing the Cathoguard mixed with PANI-PTSA at 36° C. for 6 minutes at 250 V. The topcoat film was rinsed with deionized water, blow dried with nitrogen and cured at 150° C. for 30 minutes.

A second 1" by 3" aluminum plate was electrodeposited in the bath containing the Cathoguard mixed with PANI-PTSA at 36° C. for 4 minutes at 190 V. Following a deionized-water rinse, the base coat film was soaked for 2 minutes in 0.5M p-toluene sulfonic acid, blow dried with nitrogen and cured at 150° C. for 30 minutes. A topcoat was electrodeposited in the bath containing the Cathoguard mixed with PANI-PTSA at 32° C. for 4 minutes at 190 V.

The film was rinsed with deionized water, blow dried with nitrogen and cured at 150° C. for 30 minutes. A third coated aluminum plate was prepared by repeating the method above at a temperature of 34° C. for electrodepositing the base coat and a temperature of 36° C. for electrodepositing the topcoat.

Example 13

This example illustrates the thickness of the electrodeposited coatings.

An Elcometer Model 345NT digital coating thickness gauge was used to measure the thickness of various electrodeposited coatings deposited on one inch by three inch aluminum plates. Electrodeposition compositions were either Cathoguard as in examples 1–9 or Cathoguard mixed with 5 grams of PANI-PTSA as in example 10. Mixing of the Cathoguard mixed with polyaniline salt was for a period of 9 days or longer. The electrodeposition time was 4 minutes and the bath temperature was 30° C. Voltage was 190 V except for two low-voltage coating preparations in which the voltage used was either 50 or 20 Volts. Doped coatings were prepared as in Example 11 by soaking the electrodeposited coatings in 0.5M p-toluene sulfonic acid (PTSA Soak) and curing. All measurements were made after curing the coatings.

At least 12 measurements of thickness were made at several points on each sample to obtain an average value for each coating. The average value for each of the coating samples was grouped with values from coating samples prepared from the same electrodeposition composition and under the same or similar experimental conditions (Table 3). Means were calculated for each group of samples and are reported in Table 3.

In two initial preparation, a one-hour mixing of the electrodeposition resin composition was used and coatings of 25μ and 29μ in thickness were obtained. Thereafter, mixing was for 9 days or longer to achieve more thorough mixing. Substantially thicker coatings were obtained suggesting that mixing was incomplete after only one hour such that the longer mixing times were required. (See table 3).

In the preparing multilayered coatings with base and topcoat, the first preparation (80μ thickness in Table 3) was made by depositing the base at 36° C. and the topcoat at 32° C. and the second preparation (111μ thickness in Table 3) was made by depositing the base at 34° C. and the topcoat at 36° C. (see Example 12).

As shown in Table 3, coatings of greater thickness were obtained with the resin composition of PANI-PTSA mixed with Cathoguard compared to the Cathoguard resin alone. The PTSA Soak appeared to shrink the coatings inasmuch as coatings treated with the PTSA Soak to make them conductive showed a decrease in thickness compared to coatings that were not treated with the PTSA Soak.

Reduced voltage levels of 50 and 20 Volts for 4 minutes were shown to produce coatings from the resin composition of Cathoguard mixed with PANI-PTSA. The coating thickness obtained with this mixture at reduced voltage levels was comparable to the thickness obtained with Cathoguard alone at 190 V.

The base and topcoat were produced as in Example 12 by electrodepositing of a base coat on an aluminum plate, rinsing with deionized water and soaking in bath containing PTSA, curing, electrodepositing of a topcoat, rinsing with deionized water and curing. Coatings of substantially greater thickness were obtained by this method than were obtained with deposition of a single-layered coating (see Table 3).

TABLE 3

| | Cathoguard | Cathoguard +PANI-PTSA | Cathoguard +PANI-PTSA | Cathoguard + PANI-PTSA + PTSA Soak | Cathoguard + PANI-PTSA + PTSA Soak (Base + Topcoat) |
|---|---|---|---|---|---|
| | 28μ | 39μ | 31μ[a] | 29μ | 80μ |
| | 20μ | 36μ | 27μ[b] | 34μ | 111μ |
| | 27μ | 50μ | | 35μ | |
| | | 42μ | | 40μ | |
| | | 57μ | | 35μ | |
| | | | | 37μ | |
| Mean | 25μ | 45μ | 29μ | 35μ | 96μ |

[a] Voltage = 50 V
[b] Voltage = 20 V

In view of the above, it will be seen that the several objects of the invention are achieved and other advantageous results attained.

As various changes could be made in the above constructions without departing from the scope of the invention, it is intended that all matter contained in the above description shall be interpreted as illustrative and not in a limiting sense.

What is claimed is:

1. A composition for forming a cathodically electrodepositable coating comprising water and a cathodically electrodepositable mixture of a cationic intrinsically insulative polymer (IIP) and an organic acid salt of an intrinsically conductive polymer (ICP).

2. A composition according to claim 1 wherein said ICP is polyaniline, polypyrrole or polythiophene.

3. A composition according to claim 2 wherein said organic acid is a sulfonic acid, a phosphonic acid, a carboxylic acid or a mixture thereof.

4. A composition according to claim 1 wherein said IIP is selected from the group consisting of epoxide resins, polyurethanes, aminoplast resins and acrylic resins.

5. A composition according to claim 1 wherein said electrodepositable mixture comprises polyaniline and epoxy resin and wherein the composition further comprises a thermally activatable crosslinking agent.

* * * * *